US006921605B2

(12) United States Patent
Gorer

(10) Patent No.: US 6,921,605 B2
(45) Date of Patent: *Jul. 26, 2005

(54) PLATINUM-RUTHENIUM-NICKEL FUEL CELL ELECTROCATALYST

(75) Inventor: Alexander Gorer, Sunnyvale, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/785,886

(22) Filed: Feb. 24, 2004

(65) Prior Publication Data

US 2004/0166396 A1 Aug. 26, 2004

Related U.S. Application Data

(60) Continuation of application No. 10/223,767, filed on Aug. 20, 2002, now Pat. No. 6,723,678, which is a division of application No. 09/513,559, filed on Feb. 25, 2000, now Pat. No. 6,517,965.
(60) Provisional application No. 60/121,970, filed on Feb. 26, 1999.

(51) Int. Cl.[7] .............................. H01M 4/86; B01J 23/00
(52) U.S. Cl. .............................. 429/40; 429/44; 429/46; 429/19; 502/325; 502/337; 502/339
(58) Field of Search .............................. 429/40, 44, 46, 429/19; 502/325, 337, 339, 326

(56) References Cited

U.S. PATENT DOCUMENTS

| | | |
|---|---|---|
| 4,039,409 A | 8/1977 | LaConti et al. |
| 4,447,506 A | 5/1984 | Luczak et al. |
| 4,478,917 A | 10/1984 | Fujita et al. |
| 4,806,515 A | 2/1989 | Luczak et al. |
| 5,024,905 A | 6/1991 | Itoh et al. |
| 5,183,713 A | 2/1993 | Kunz |
| 5,208,207 A | 5/1993 | Stonehart et al. |
| 5,225,391 A | 7/1993 | Stonehart et al. |
| 5,246,791 A | 9/1993 | Fisher et al. |
| 5,773,162 A | 6/1998 | Surampudi et al. |
| 5,856,036 A | 1/1999 | Smotkin et al. |
| 6,007,934 A | 12/1999 | Auer et al. |
| 6,517,965 B1 * | 2/2003 | Gorer .......................... 429/40 |
| 6,723,678 B2 * | 4/2004 | Gorer .......................... 429/40 |

FOREIGN PATENT DOCUMENTS

EP 838872 A2 4/1998

OTHER PUBLICATIONS

Gerhard L. Holleck et al; "Carbon Monoxide Tolerant Anodes for Proton Exchange Membrane (PEM) Fuel Cells"; Abstract No. 1086.

Baker et al; "Solution–Based Assembly of Metal Surfaces by Combinatorial Methods", J. Am. Chemical Society; pp. 8721–8722; 1996.

Mallouk et al; "Discovery of Methanol Electro–Oxidation Catalysts by Combinatorial Analysis"; pp. 686–689 of "Programs and Abstracts" from Fuel Cell Seminar held Nov. 17–20, 1996 in Orlando, Florida.

"Fuel Cells Promise Cleaner Energy"; Nickel Magazine; Jun. 1998.

Reddington et al; "Combinatorial Electrochemistry: A Highly Parallel, Optical Screening Method for Discovery of Better Electrocatalysts"; Science, vol. 280, pp. 1735–1737; Jun. 12, 1998.

(Continued)

Primary Examiner—Laura Weiner
(74) Attorney, Agent, or Firm—Senniger Powers

(57) ABSTRACT

A catalyst suitable for use in a fuel cell, especially as an anode catalyst, that contains platinum, ruthenium, and nickel, wherein the nickel is at a concentration that is less than about 10 atomic percent.

20 Claims, 3 Drawing Sheets

OTHER PUBLICATIONS

Holleck et al; "Carbon Monoxide Tolerant Anodes for Proton Exchange Membrane (PEM) Fuel Cells. II. Alloy Catalysts Development"; pp. 150–161; Proceedings of the Second International Symposium on Proton Conducting Membrane Fuel Cells II in Pennington, NJ; The Electrochemical Society, Inc., vol. 98–27; 1999.

Sullivan et al; "Automated Electrochemical Analysis with Combinatorial Electrode Arrays"; Analytical Chemistry, vol. 71, No. 19; pp. 4369–4375; Oct. 1, 1999.

"Opening Doors to Fuel Cell Commercialisation"; Fuel Cell Today/ Dec. 27, 2001.

* cited by examiner

PLATINUM-RUTHENIUM-NICKEL FUEL CELL ELECTROCATALYST

CROSS-REFERENCE TO RELATED APPLICATIONS

This application is a continuation of U.S. application Ser. No. 10/223,767, filed Aug. 20, 2002, now U.S. Pat. No. 6,723,678 which is a divisional of U.S. application Ser. No. 09/513,559, filed Feb. 25, 2000, U.S. Pat. No. 6,517,965, which claims the benefit of U.S. Provisional Application 60/121,970, filed Feb. 26, 1999, each of which is hereby incorporated herein by reference.

STATEMENT REGARDING FEDERALLY SPONSORED RESEARCH OR DEVELOPMENT

This was made with Government support under grant number DE-FG03-97ER82492 awarded by the Department of Energy. The Government has certain rights in this invention.

BACKGROUND OF THE INVENTION

1. Field of the Invention

The present invention relates to Group VIII metal alloy catalysts, especially to platinum, ruthenium and nickel alloy catalysts compositions, which are useful in fuel cell electrodes and other catalytic structures.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized releasing electrons which are conducted via an external circuit to the cathode. At the cathode the supplied electrons are consumed when the oxidizer is reduced. The current flowing through the external circuit can be made to do useful work.

There are several types of fuel cells, including: phosphoric acid, molten carbonate, solid oxide, potassium hydroxide, and proton exchange membrane. A phosphoric acid fuel cell operates at about 160–220° C., and preferably at about 190–200° C. This type of fuel cell is currently being used for multi-megawatt utility power generation and for co-generation systems (i.e., combined heat and power generation) in the 50 to several hundred kilowatts range.

In contrast, proton exchange membrane fuel cells use a solid proton-conducting polymer membrane as the electrolyte. Typically, the polymer membrane must be maintained in a hydrated form during operation in order to prevent loss of ionic conduction which limits the operation temperature typically to about 70–120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small scale residential power generation where quick startup is required.

Conventional fuel cells use hydrogen gas as the fuel. Pure hydrogen gas, however, is difficult and costly to supply. Thus, hydrogen gas is typically supplied to a fuel cell using a reformer, which steam-reforms methanol and water at 200–300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen and, depending on the degree of purity, varying amounts of carbon monoxide (up to 1 vol %). This process is also complex, adds cost and has the potential for producing undesirable pollutants. The conversion of a liquid fuel directly into electricity would be desirable, as then a high storage density, system simplicity and retention of existing fueling infrastructure could be combined. In particular, methanol is an especially desirable fuel because it has a high energy density, a low cost and is produced from renewable resources. Thus, a relatively new type of fuel cell has been the subject of a great amount of interest—the direct methanol fuel cell. In a direct methanol fuel cell, the overall process that occurs is that methanol and oxygen react to form water and carbon dioxide and electricity, i.e., methanol combustion.

For the oxidation and reduction reactions in a fuel cell to proceed at useful rates, especially at operating temperatures below about 300° C., electrocatalyst materials are required at the electrodes. Initially, fuel cells used electrocatalysts made of a single metal, usually platinum (Pt), palladium (Pd), rhodium (Rh), iridium (Ir), osmium (Os), silver (Ag) or gold (Au) because they are able to withstand the corrosive environment—platinum being the most efficient and stable single-metal catalyst for fuel cells operating below about 300° C. While these elements were first used in solid form, later techniques were developed to disperse these metals over the surface of electrically conductive supports (e.g., carbon black) to increase the surface area of the catalyst which in turn increased the number of reactive sites leading to improved efficiency of the cell. Nevertheless, fuel cell performance typically declines over time because the presence of electrolyte, high temperatures and molecular oxygen dissolve the catalyst and/or sinter the dispersed catalyst by surface migration or dissolution/re-precipitation (see, e.g., U.S. Pat. No. 5,316,990).

Although platinum is a good catalyst, concentrations of carbon monoxide (CO) above about 10 ppm in the fuel can rapidly poison the catalyst surface. As a result, platinum is a poor catalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

$$Pt + CH_3OH \rightarrow Pt\text{---}CO + 4H^+ + 4e^- \quad (1)$$

$$Pt + H_2O \rightarrow Pt\text{---}OH + H^+ + e^- \quad (2)$$

$$Pt\text{---}CO + Pt\text{---}OH \rightarrow 2Pt + CO_2 + H^+ + e^- \quad (3).$$

As indicated by the foregoing reactions, the methanol is adsorbed and partially oxidized by platinum on the surface of the electrode (2). Adsorbed OH, from the hydrolysis of water (3), reacts with the adsorbed CO to produce carbon dioxide and a proton. However, platinum does not adsorb $H_2O$ species well at the potentials fuel cell electrodes operate (e.g., 200 mV–1.5 V). As a result, step (3) is the slowest step in the sequence, limiting the rate of CO removal thereby poisoning the catalyst. This applies in particular to a Proton exchange membrane fuel cell which is especially sensitive to CO poisoning as a result of its low operating temperatures.

One technique for alleviating fuel cell performance reduction due to anode CO poisoning is to employ an anode electrocatalyst which is itself more poison tolerant, but which still functions as a hydrogen oxidation catalyst in the presence of carbon monoxide. It is known that the tolerance of platinum poisoning by carbon monoxide is improved by alloying the platinum with ruthenium, preferably compositions centered around 50:50 atomic ratio (see, e.g., D. Chu and S. Gillman, *J. Electrochem. Soc.* 1996,143, 1685).

It has been reported that the success of the platinum-ruthenium catalyst alloys is based on the ability of ruthenium to adsorb $H_2O$ species at potentials where methanol is adsorbing on the platinum and facilitate the carbon monoxide removal reaction. This dual function, that is, to adsorb both reactants on the catalyst surface on adjacent metal sites, is known as the bifunctional mechanism in accordance with the following reaction:

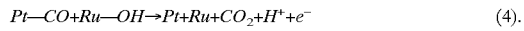

$$Pt\text{---}CO+Ru\text{---}OH \rightarrow Pt+Ru+CO_2+H^++e^- \quad (4).$$

It has been suggested that having platinum and ruthenium in adjacent sites forms an active site on the catalyst surface where methanol is oxidized in a less poisoning manner because the adjacent metal atoms are more efficiently adsorbing the methanol and the water reactants.

Although knowledge of phase equilibria and heuristic bond strength/activity relationships provide some guidance in the search for more effective catalyst compositions, there is at present no way to calculate the chemical composition of different metals that will afford the best catalyst activity for the direct methanol-air fuel cell reaction. As such, the search continues for stable, CO poisoning resistant and less costly catalysts having increased electrochemical activities.

BRIEF SUMMARY OF THE INVENTION

Among the objects of the invention are the preparation of catalysts based on platinum, ruthenium and nickel which have a high resistance to poisoning by carbon monoxide thereby improving the efficiency of a fuel cell, decreasing the size of a fuel cell and reducing the cost of operating a fuel cell.

Briefly, therefore, the present invention is directed to a catalyst for use in electrochemical reactor devices. The catalyst contains platinum, ruthenium, and nickel, wherein the nickel is at a concentration that is less than about 10 atomic percent.

The present invention is also directed to a metal alloy containing platinum, ruthenium and nickel, wherein the concentration of nickel is less than about 10 atomic percent.

Additionally, the present invention is directed to a supported electrocatalyst powder for use in electrochemical reactor devices. The supported electrocatalyst powder comprises a catalyst on electrically conductive supports, wherein the catalyst contains platinum, ruthenium, and nickel, and wherein the nickel is at a concentration that is less than about 10 atomic percent.

Further, the present invention is directed to a fuel cell electrode that comprises a catalyst dispersed on the surface of an electrically conductive support. The catalyst contains platinum, ruthenium and nickel, wherein the nickel is at a concentration that is less than about 10 atomic percent.

The present invention is also directed to a fuel cell. The fuel cell comprises an anode, a cathode, a proton exchange membrane between the anode and the cathode, and a catalyst for the catalytic oxidation of a hydrogen-containing fuel. The catalyst contains platinum, ruthenium and nickel, wherein the nickel is at a concentration that is less than about 10 atomic percent.

The foregoing and other features and advantages of the present invention will become more apparent from the following description and accompanying drawing.

DETAILED DESCRIPTION OF THE INVENTION

The present invention is directed to a multi-component Group VIII metal alloy composition for use in fuel cells. In particular, the present invention is directed to ternary alloy compositions consisting essentially of platinum, ruthenium and nickel. Surprisingly, PtRuNi ternary alloys possess catalytic activity with less cost than platinum-ruthenium binary alloys. The composition of the PtRuNi ternary alloys is based in part on the desired catalytic activity and cost. In general, the catalytic activity decreases with increasing concentrations of nickel. As such, the concentration of nickel is preferably less than about 30 atomic percent, more preferably less than about 20 atomic percent, and still more preferably less than about 10 atomic percent. Likewise, the cost of a ternary alloy decreases with increasing nickel concentration. Consequently, the concentration of nickel is preferably at least about 1 atomic percent, more preferably at least about 2 atomic percent, and still more preferably at least about 4 atomic percent. In some applications, e.g., when cost constraints are particularly important, the concentration of nickel is preferably at least about 10 atomic percent. Thus, the composition of a PrRuNi ternary alloy catalyst is selected to meet the application requirements.

In one embodiment of the present invention, therefore, the PtRuNi ternary alloy contains, in atomic percentages, about 40% to about 70% platinum, about 30% to about 50% ruthenium and less than about 30% nickel, preferably less than about 20%, more preferably less than about 10%. In another embodiment of the present invention, the PtRuNi ternary alloy contains, in atomic percentages, about 45% to about 65% platinum, about 35% to about 50% ruthenium and less than about 20% nickel, preferably less than about 10% nickel. In a further embodiment of the present invention, the PtRuNi ternary alloy contains, in atomic percentages, about 50% to about 60% platinum, about 40% to about 50% ruthenium and less than about 10% nickel. Specific alloys which have been found to exhibit methanol oxidation activity include the alloys corresponding the empirical formula $Pt_xRu_yNi_{1-x-y}$ wherein x and y have the following values.

| X | Y |
|---|---|
| 54 | 40 |
| 51 | 43 |

Figure 1:
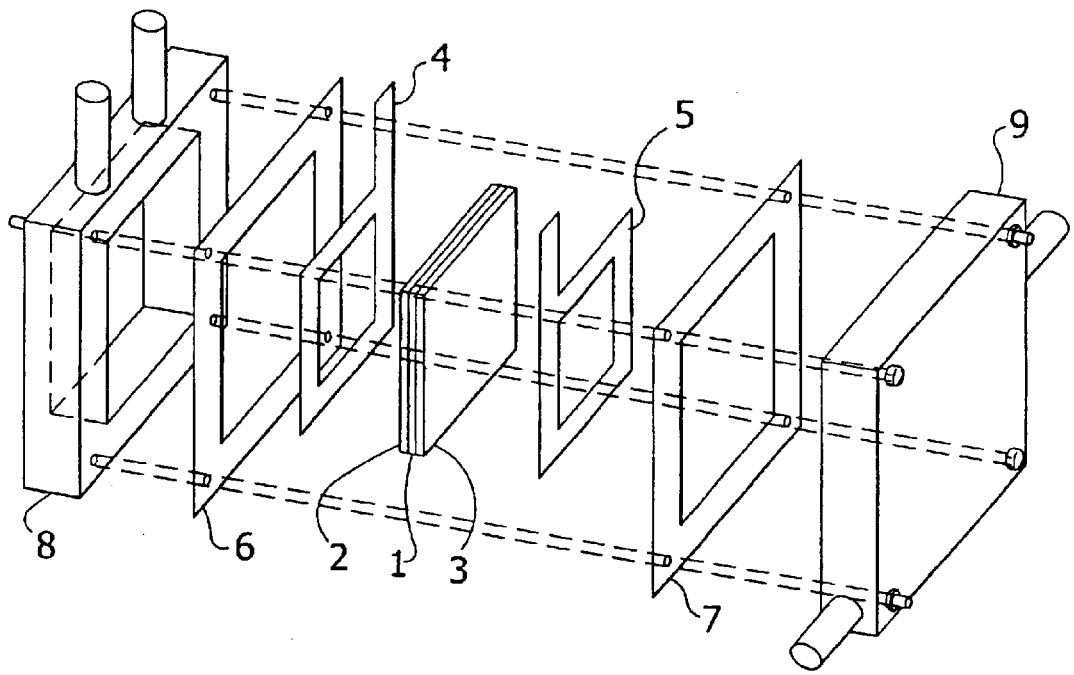
FIG. 1 is a schematic structural view showing essential members of a methanol fuel cell.
Figure 2:
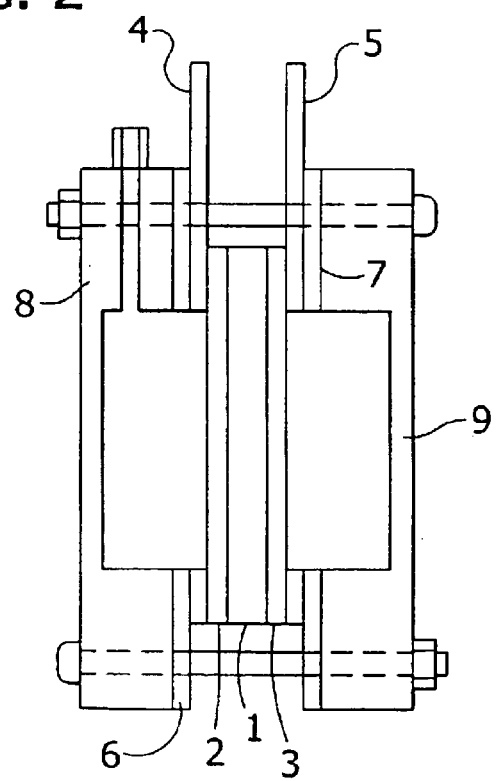
FIG. 2 is a side view of a methanol fuel cell.

Although the PtRuNi ternary alloy compositions of the present invention can be used in a phosphoric acid fuel cell, they are particularly useful in a direct methanol fuel cell. As shown in FIG. 1 and FIG. 2, a direct methanol fuel cell has a methanol electrode (fuel electrode or anode) 2 and an air electrode (oxidizer electrode or cathode) 3. In between the electrodes, a proton exchange membrane 3 serves as an electrolyte.

Preferably, in a fuel cell according to the present invention, the proton exchange membrane 1, the anode 2 and the cathode 3 are integrated into one body, and thus there is no contact resistance between the electrodes 2 and 3 and the proton exchange membrane 1. Current collectors 4 and 5 are at the anode and cathode, respectively. A methanol fuel chamber is indicated by numeral 8 and an air chamber is indicated by numeral 9. Numeral 6 is a sealant for the methanol fuel chamber and numeral 7 is a sealant for the air chamber. It is desirable to use a strongly acidic ion exchange membrane (e.g., perfluorosulphonic acid based membranes are widely used).

In general, electricity is generated by methanol combustion (i.e., methanol and oxygen react to form water, carbon dioxide and electricity). This is accomplished in the above-described fuel cell by introducing the methanol into the methanol fuel chamber 8, while oxygen, preferably air is introduced into the air chamber 9, whereby an electric current can be immediately withdrawn therefrom into an outer circuit. Ideally, the methanol is oxidized at the anode to produce carbon dioxide gas, hydrogen ions and electrons. The thus formed hydrogen ions migrate through the strongly acidic proton exchange membrane 1 and react with oxygen and electrons from the outer circuit at the cathode 3 to form water. Typically, the methanol is introduced as a dilute acidic solution to enhance the chemical reaction thereby increasing power output (e.g., a 0.1 M methanol/0.5 M sulfuric acid solution).

Typically, the proton exchange membranes must remain hydrated during operation of the fuel cell in order to prevent loss of ionic conduction, thus the membrane is preferably heat-resistant up to about 100–120° C. Proton exchange membranes usually have reduction and oxidation stability, resistance to acid and hydrolysis, sufficiently low electrical resistivity (e.g., <10 $\Omega \cdot cm$), and low hydrogen or oxygen permeation. Additionally, proton exchange membranes are usually hydrophilic, this ensures proton conduction (by reversed diffusion of water to the anode), and prevents the membrane from drying out thereby reducing the electrical conductivity. For the sake of convenience, the layer thickness of the membranes is typically between 50 and 200 $\mu$m. In general, the foregoing properties are achieved with materials which have no aliphatic hydrogen-carbon bonds, which, for example, is achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as Nafion® and its derivatives produced by E.I. du Pont de Nemours & Co., Wilmington, Del. Nafion® is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds which, in a plasma polymer, do not form any aliphatic H atoms which could constitute attack sites for oxidative breakdown.

In general, the electrodes of the present invention comprise an electrically conductive material and are in contact with the PtRuNi ternary catalyst of the present invention. The electrically conductive support is typically inorganic, preferably a carbon support. The carbon supports may be predominantly amorphous or graphitic. They may be prepared commercially, or specifically treated to increase their graphitic nature (e.g., heat treated at a high temperature in vacuum or in an inert gas atmosphere) thereby increasing corrosion resistance. For example, it may be oil furnace black, acetylene black, graphite paper, carbon fabric or carbon aerogel. Preferably, the electrode is designed to increase cell efficiency by enhancing contact between the reactant (i.e., fuel or oxygen), the electrolyte and the electrocatalyst. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and products, particularly water to diffuse out of the electrode. Preferably, carbon black supports have a Brunauer, Emmett and Teller (BET) surface area of between 0 and 2000 $m^2/g$, and preferably between 30 and 400 $m^2/g$, more preferably between 60 to 250 $m^2/g$. On the other hand, the carbon aerogel preferably has an electrical conductivity of between $10^{-2}$ and $10^3$ $\Omega^- \cdot cm^{-1}$ and a density of between 0.06 and 0.7 $g/cm^3$; the pore size is between 20 and 100 nm (porosity up to about 95%).

Preferably, the proton exchange membrane, electrodes and catalyst materials are in contact. This is generally accomplished by depositing the catalyst either on the electrode, or the proton exchange membrane, and then the electrode and membrane placed in contact. The alloy catalysts of this invention can be deposited on either substrate by a variety of methods, including, plasma deposition, powder application, chemical plating, and sputtering. Plasma deposition generally entails depositing a thin layer (e.g., between 3 and 50 $\mu$m, preferably between 5 and 20 $\mu$m) of a catalyst composition on the membrane using low-pressure plasma. By way of example, an organic platinum compound such as trimethylcyclopentadienylplatinum is gaseous between $10^{-4}$ and 10 mbar and can be excited using radio-frequency, microwaves or an electron cyclotron resonance transmitter to deposit platinum on the membrane. According to another procedure, catalyst powder is distributed onto the proton exchange membrane surface and integrated at an elevated temperature under pressure. If, however, the amount of catalyst particles exceeds about 2 $mg/cm^2$ the inclusion of a binder such as polytetrafluoroethylene is common. Further, the catalyst may be plated with dispersed relatively small particles, e.g., about 20–200 Å, more preferably about 20–100 Å. This increases the catalyst surface area which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid or formalin is slowly added dropwise to disperse and deposit the metallic components on the carrier as insoluble compounds or partly reduced fine metal particles.

The surface concentration of catalyst on the membrane or electrode is based in part on the desired power output and cost for a particular fuel cell. In general, power output increases with increasing concentration, however, there is a level beyond which performance is not improved. Likewise, the cost of a fuel cell increases with increasing concentration. Thus, the surface concentration of catalyst is selected to meet the application requirements. For example, a fuel cell designed to meet the requirements of a demanding application such as an outer space vehicle will usually have a surface concentration of catalyst sufficient to maximize the fuel cell power output. Preferably, the desired power output is obtained with as little catalyst as possible. Typically, it is desirable that about 0.25 to about 6 $mg/cm^2$ of catalyst particles be in contact with the electrodes. If the surface concentration of catalyst particles is less than about 0.25 $mg/cm^2$, the cell performance usually declines, whereas, above about 6 $mg/cm^2$ the cell performance is usually not improved.

To promote contact between the collector, electrode, catalyst and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the ternary catalyst and electrodes of the present invention may be used to catalyze any fuel containing hydrogen (e.g., hydrogen and reformated-hydrogen fuels). The improved catalytic activity of the PtRuNi ternary alloys, however, are particularly realized in the catalysis of hydrocarbon-based fuels. Applicable hydrocarbon-based fuels include saturated hydrocarbons such as methane (natural gas), ethane, propane and butane; garbage off-gas; oxygenated hydrocarbons such as methanol and ethanol; and fossil fuels such as gasoline and kerosene; and mixtures thereof. The most preferred fuel, however, is methanol.

To achieve the full ion-conducting property of proton exchange membranes, suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used (see, e.g., "Ber. Bunsenges. Phys. Chem.", Volume 98 (1994), pages 631 to 635).

DEFINITIONS

Activity is defined as the maximum sustainable, or steady state, current (Amps) obtained from the catalyst, when fabricated into an electrode, at a given electric potential, or efficiency (Volts). Additionally, because of differences in the geometric area of electrodes, when comparing different catalysts, activity is often expressed in terms of current density ($A/cm^2$).

EXAMPLE 1

A tremendous amount of research has concentrated on exploring the activity of surface modified binary, and to a much lesser extent ternary, alloys of platinum in an attempt to both increase the efficiency of and reduce the amount of precious metals in the anode part of the fuel cell. Although electrodeposition was explored as a route to the synthesis of anode materials (see, e.g., F. Richarz et al. *Surface Science*, 1995, 335, 361), only a few compositions were actually prepared, and these compositions were made using traditional single point electrodeposition techniques.

In contrast, the catalyst alloy compositions of this invention were prepared using the combinatorial techniques disclosed in U.S. patent application Ser. No. 09/119,187, filed Jul. 20, 1998. Specifically, an array of independent electrodes (with areas of between about 1 and 2 $mm^2$) were fabricated on inert substrates (e.g., glass, quartz, sapphire alumina, plastics, and thermally treated silicon). The individual electrodes were located substantially in the center of the substrate, and were connected to contact pads around the periphery of the substrate with wires. The electrodes, associated wires, and contact pads were fabricated from conducting materials (e.g., gold, silver, platinum, copper or other commonly used electrode materials). In a preferred embodiment, the arrays were fabricated on standard 3" (about 7.5 cm) thermally oxidized single crystal silicon wafers, and the electrodes were gold with surface areas of about 1.26 $mm^2$.

A patterned insulating layer covered the wires and an inner portion of the peripheral contact pads, but left the electrodes and the outer portion of the peripheral contact pads exposed (preferably approximately half of the contact pad is covered with this insulating layer). Because of the insulating layer, it is possible to connect a lead (e.g., an alligator clip) to the outer portion of a given contact pad and address its associated electrode while the array is immersed in solution, without having to worry about reactions that can occur on the wires or peripheral contact pads. The insulating layer may be, for example, glass, silica, alumina, magnesium oxide, silicon nitride, boron nitride, yttrium oxide, titanium dioxide, hardened photoresist, or other suitable material known to be insulating in nature.

Once a suitable inert substrate was provided, in this case thermally oxidized single crystal silicon was selected, photolithographic techniques were used to design and fabricate electrode patterns on it. By applying a predetermined amount of photoresist to the substrate, photolyzing preselected regions of the photoresist, removing those regions that have been photolyzed (e.g., by using an appropriate developer), depositing one or more metals over the entire surface and removing predetermined regions of these metals (e.g. by dissolving the underlying photoresist), intricate patterns of individually addressable electrodes were fabricated on the substrate.

The fabricated arrays consisted of a plurality of individually addressable electrodes that were insulated from each other (by adequate spacing) and from the substrate (fabricated on an insulating substrate), and whose interconnects were insulated from the electrochemical testing solution (by the hardened photoresist or other suitable insulating material).

Materials were deposited on the above described electrode arrays to prepare a library of compositions by the electrodeposition of species from solution using standard electrochemical methods. More specifically, the depositions were carried out by immersing the electrode array in a standard electrochemical deposition chamber containing the array, a platinum mesh counter electrode, and a reference electrode (e.g., Ag/AgCl). The chamber was filled with a plating solution containing known amounts of source material to be deposited. By selecting a given electrode and applying a predetermined potential for a predetermined amount of time, a particular composition of materials (which may or may not correspond to the exact composition of the plating solution) was deposited on the electrode surface. Variations in the compositions deposited may be obtained either by directly changing the solution composition for each deposition or by using different electrochemical deposition techniques, or both. Examples of how one may change the electrode composition by changing the deposition technique can include: changing the deposition potential, changing the length of the deposition time, varying the counter anions, using different concentrations of each species, and even using different electrochemical deposition programs (e.g., potentiostatic oxidation/reduction, galvanostatic oxidation/reduction, potential square-wave voltammetry, potential stair-step voltammetry, etc.). In any event, through repeated deposition steps, a variety of materials were deposited on the array.

After synthesizing the various alloy compositions on the array, the different alloys were screened for methanol oxidation to determine relative catalytic activity against a standard alloy composition.

EXAMPLE 2

Using the procedures described in Example 1 to synthesize catalyst compositions by electrodeposition, the following aqueous stock solutions were prepared in 0.5 M sulfuric acid ($H_2SO_4$): 0.03 M platinum chloride ($H_2PtCl_6$), 0.05 M ruthenium chloride ($RuCl_3$), and 0.1 M nickel (II) bromide hydrate ($NiBr_2.3H_2O$). The sulfuric acid merely served as an electrolyte thereby increasing the plating efficiency. A standard plating solution was created by combining 15 ml of the platinum chloride stock solution and 12 ml of the ruthenium chloride stock solution. The electrodes on the array were then immersed in the standard plating solution. A potential of –0.93 V vs Ag/AgCl was applied for 2 minutes to the first electrode (Electrode #1 in FIG. 3). The thickness of the layer deposited on the electrode ranged from about 1500 and about 2000 Å. The composition of the PtRu alloy plated under these conditions is represented by the formula $Pt_{0.65}Ru_{0.35}$.

To synthesize a PtRuNi ternary alloy composition, an aliquot of the nickel bromide stock solution (e.g., 0.2 ml) was added to the standard PtRu plating solution and the second electrode was then plated at –0.93 V vs. Ag/AgCl for 2 minutes. The amount of nickel in subsequently deposited alloys was increased by adding nickel bromide stock solution to the plating solution. Thus, a library of alloy compositions can be created by varying the relative amounts of different stock solutions in the plating solution (e.g., Electrodes #2–#11 in FIG. 3 were plated under identical conditions except that the relative amounts of the stock solutions were varied).

After synthesizing the various alloy compositions on the array, the different compositions were screened for methanol oxidation activity by placing the array into an electrochemical cell, which was filled with a room temperature solution of 1M methanol in 0.5 M $H_2SO_4$. The cell also contained in $Hg/HgSO_4$ reference electrode and a platinum mesh counter electrode. Chronoamperometry measurements (i.e., holding a given electrode at a given potential and measuring the current that passes as a function of time) were then performed on all of the electrodes by pulsing each individual electrode to a potential of 0.3 V vs NHE (Normal Hydrogen Electrode) and holding it there for about 6 minutes while monitoring and recording the current that flowed.

The alloy compositions on Electrodes #1, #2 and #3 were analyzed using x-ray fluorescence (XRF) to determine their compositions. It is commonly accepted that the chemical compositions determined using x-ray fluorescence are within about 5% of the actual composition. Electrode #1 alloy contained about 65 atomic percent platinum, and about 35 atomic percent ruthenium %. Electrode #2 alloy contained about 54 atomic percent platinum, about 35 atomic percent ruthenium, and about 6 atomic percent nickel. Electrode #3 alloy contained about 51 atomic percent platinum, about 43 atomic percent ruthenium, and about 6 atomic percent nickel. Although the detection limit for a signal corresponding to nickel is about 6 atomic percent, concentrations of nickel below that level can be estimated by comparing the relative intensity of the XRF spectra signals corresponding to platinum and ruthenium.

Figure 3:
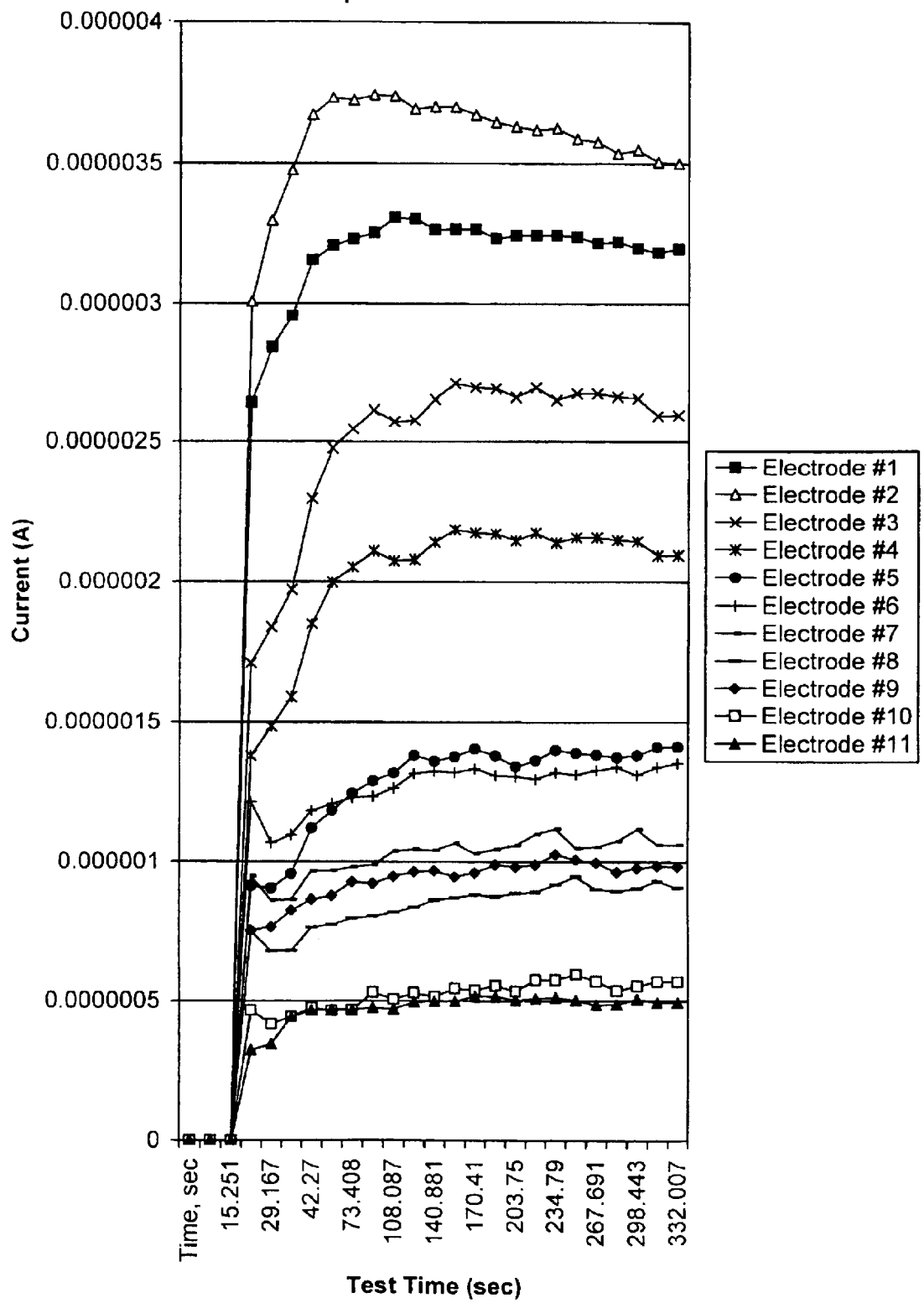
FIG. 3 is a graph comparing the catalytic activity, at a constant voltage and as a function of time, of several alloy compositions including a PtRu binary alloy and PtRuNi ternary alloys. Only the PtRuNi alloy compositions on Electrodes #2–#11 are within the scope of the claimed invention.

The data represented in FIG. 3 indicates that the PtRu binary alloy on Electrode #1 and the PtRuNi ternary alloys on Electrodes #2–#11 show methanol oxidation activity.

Figure 4:
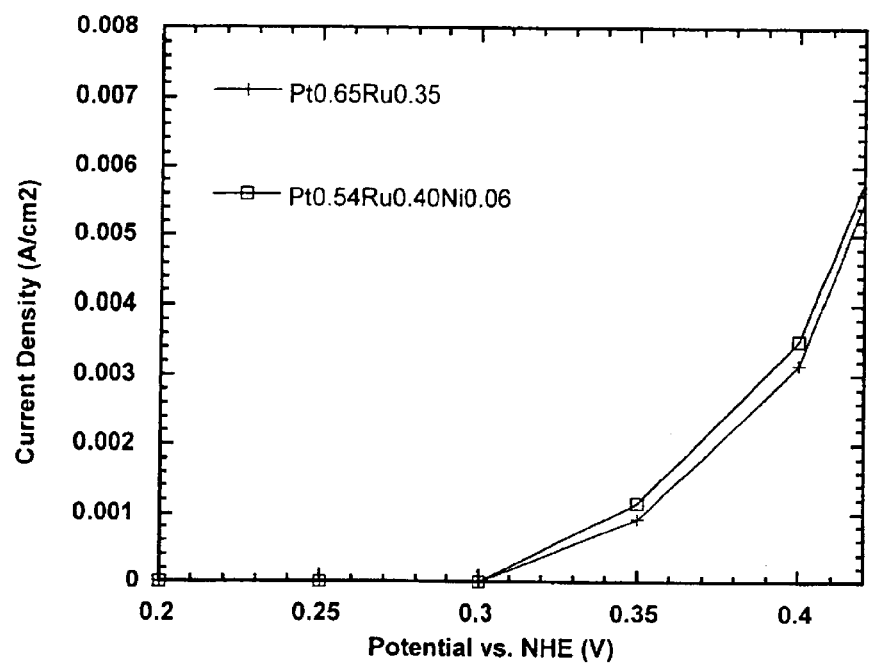
FIG. 4 is a graph comparing the catalytic activity of a PtRuNi ternary alloy composition to a PtRu binary composition as a function of voltage.

The activity of the most preferred ternary alloy, $Pt_{0.54}Ru_{0.4}Ni_{0.06}$ (Electrode #2) was also compared to that of $Pt_{0.65}Ru_{0.35}$ as a function of increasing voltage (see, FIG. 4). FIG. 4 indicates that the $Pt_{0.54}Ru_{0.4}Ni_{0.06}$ alloy oxidizes methanol at lower electrical potentials than the PtRu standard. Also, the $Pt_{0.54}Ru_{0.4}Ni_{0.06}$ alloy has a greater catalytic activity for a given potential than the standard.

It is to be understood that the above description is intended to be illustrative and not restrictive. Many embodiments will be apparent to those of skill in the art upon reading the above description. The scope of the invention should therefore be determined not with reference to the above description alone, but should also be determined with reference to the claims and the full scope of equivalents to which such claims are entitled. The disclosures of all articles, patents and references, including patent applications and publications, are incorporated herein by reference for all purposes.

What is claimed is:

1. A catalyst for use in electrochemical reactor devices, the catalyst containing platinum, ruthenium, and nickel, wherein the nickel is at a concentration that is less than about 10 atomic percent.

2. The catalyst of claim 1 wherein the catalyst is an alloy.

3. The catalyst of claim 1 wherein the concentration of nickel is at least about 1 atomic percent.

4. The catalyst of claim 1 wherein the concentration of nickel is at least about 2 atomic percent.

5. The catalyst of claim 1 wherein the concentration of nickel is at least about 4 atomic percent.

6. The catalyst of claim 1 wherein the platinum is at a concentration that is between about 40 and about 70 atomic percent and the ruthenium is at a concentration that is between about 30 and about 50 atomic percent.

7. The catalyst of claim 6 wherein the concentration of nickel is less than about 6 atomic percent.

8. The catalyst of claim 1 wherein the platinum is at a concentration that is between about 45 and about 65 atomic percent and the ruthenium is at a concentration that is between about 35 and about 50 atomic percent.

9. The catalyst of claim 8 wherein the concentration of nickel is less than about 6 atomic percent.

10. The catalyst of claim 1 wherein the platinum is at a concentration that is between about 50 and about 60 atomic percent and the ruthenium is at a concentration that is between about 40 and about 50 atomic percent.

11. The catalyst of claim 10 wherein the concentration of nickel is less than about 6 atomic percent.

12. A supported electrocatalyst powder for use in electrochemical reactor devices, the supported electrocatalyst powder comprising a catalyst on electrically conductive supports, the catalyst containing platinum, ruthenium, and nickel, wherein the nickel is at a concentration that is less than about 10 atomic percent.

13. The supported electrocatalyst powder of claim 12 wherein the platinum is at a concentration that is between about 40 and about 70 atomic percent and the ruthenium is at a concentration that is between about 30 and about 50 atomic percent.

14. The supported electrocatalyst powder of claim 13 wherein the concentration of nickel is less than about 6 atomic percent.

15. The supported electrocatalyst powder of claim 12 wherein the catalyst is present on the electrically conductive supports as metal alloy deposits.

16. A fuel cell comprising an anode, a cathode, a proton exchange membrane between the anode and the cathode, and a catalyst for the catalytic oxidation of a hydrogen-containing fuel, wherein the catalyst contains platinum, ruthenium and nickel, wherein the nickel is at a concentration that is less than about 10 atomic percent.

17. The fuel cell of claim 16 wherein the concentration of nickel is at least about 1 atomic percent.

18. The fuel cell of claim 16 wherein the platinum is at a concentration that is between about 40 and about 70 atomic percent and the ruthenium is at a concentration that is between about 30 and about 50 atomic percent.

19. The fuel cell of claim 18 wherein the concentration of nickel is less than about 6 atomic percent.

20. The fuel cell of claim 16 wherein the catalyst is an alloy.

\* \* \* \* \*